United States Patent [19]

Keilbach et al.

[11] Patent Number: 4,459,845
[45] Date of Patent: Jul. 17, 1984

[54] METHODS FOR DETERMINING RATE OF FUEL FLOW TO AN ENGINE

[75] Inventors: Joseph R. Keilbach, East Hartford; Ronald P. C. Lehrach, Glastonbury; Ira W. Kay, Tolland, all of Conn.

[73] Assignee: United Technologies Corporation, Hartford, Conn.

[21] Appl. No.: 391,908

[22] Filed: Jun. 25, 1982

[51] Int. Cl.³ .......................................... G01M 15/00
[52] U.S. Cl. ........................................................ 73/113
[58] Field of Search ............................ 73/114, 23, 113

[56] References Cited

U.S. PATENT DOCUMENTS 4,283,256 8/1981 Howard et al. .................... 73/23 X
4,372,155 2/1983 Butler et al. ........................ 73/114

Primary Examiner—Jerry W. Myracle
Attorney, Agent, or Firm—David L. Adour

[57] ABSTRACT

Methods for determining rate of fuel flow to a combustion engine is disclosed. The fuel flow rate determination is made by measuring a pertubation in air-to-fuel-flow ratio to the engine, or in the volumetric concentration of a gaseous test species in the exhaust, after adding a known amount of a test substance to the air flow intake to the engine, or to the exhaust from the engine, respectively. The desired fuel flow rate is calculated from the measured parameters.

6 Claims, 3 Drawing Figures

METHODS FOR DETERMINING RATE OF FUEL FLOW TO AN ENGINE

BACKGROUND OF THE INVENTION

The present invention relates to methods for determining rate of fuel flow to a combustion engine.

Vehicle engine fault and performance diagnosis is a burgeoning activity within the garage repair and motor vehicle inspection (MVI) segments of the automobile industry. Prompted by a concern for energy conservation due to the rising cost of energy, vigorous efforts are being directed toward application of electronic devices and other such equipment to facilitate vehicle engine fault detection in order that repairs necessary to achieve and/or maintain highvehicle fuel economy can be undertaken.

Laboratory studies have shown that engine fuel flow rates measured at engine speed and engine load conditions that can be simulated in a garage or MVI environment, can be correlated with on the road vehicle fuel economy. Also, engine fuel flow rate measurement appears to have potential as a means of vehicle engine fault diagnosis. In the laboratory, direct types of fuel flow rate measurement are used to ensure high precision. These direct measurements require mechanical intrusion into the vehicle engine fuel system. It is prudent to avoid such intrusion in garage and MVI environments, and it is therefore highly desirable that simple, safe, and inexpensive methods and apparatus for performing high precision fuel flow rate measurements be developed for use in these environments.

SUMMARY OF THE INVENTION

Therefore, an object of the present invention is to reliably, simply, inexpensively, safely and accurately determine rate of fuel flow to a combustion-driven engine by means suitable for use in a garage or motor vehicle inspection envirnment.

Another object of the present invention is to determine rate of fuel flow to a combustion-driven engine by means wherein mechanical intrusion into the engine fuel system is not required.

These and other objects of the present invention are attained by methods for determining rate of fuel flow to a combustion-driven engine wherein a test substance is added to the air intake to the engine or to the exhaust from the engine and measurements are made of resultant variations in parameters, such as air-to-fuel-flow ratio and/or volumetric concentrations of gaseous test species in the exhaust, from which the desired fuel flow rate is calculated. Specifically, a method for determining rate of fuel flow to a combustion-driven engine according to the present invention comprises measuring the ratio of air flow rate to fuel flow rate to the engine when the engine is running at selected fixed operating conditions to obtain a first air-to-fuel-flow ratio and, then, adding additional fuel at a constant known flow rate to the existing air-fuel flow to the engine and measuring the ratio of air flow rate to fuel flow rate after the fuel flow is increased to obtain a second air-to-fuel-flow ratio. The rate of fuel flow to the engine, when the engine is running at the selected fixed operating conditions, is obtained by dividing the product of the second air-to-fuel-flow ratio and the known additional fuel flow rate by the difference between the first air-to-fuel-flow ratio and second air-to-fuel-flow ratio. Conventional fuel supply and metering equipment provides the additional fuel at theconstant known flow rate at the air intake to the engine. The first and second air-to-fuel-flow ratios are obtained by standard exhaust gas sampling and analysis equipment. For ease, quickness, accuracy, and reliability, a pre-programmed electronic computer processing system supplied with data from the fuel supply and metering equipment and the gas sampling and analysis equipment, may be used to electronically calculate the rate of fuel flow to the engine.

Further according to the present invention, rate of fuel flow to a combustion-driven engine runningat selected fixed operating conditions may be determined by injecting a gaseous test species into the exhaust from the engine. First, volumetric concentration of a particular gaseous test species in the exhaust from the engine is measured when the engine is operating at selected fixed operating conditions to obtain a first relationship between fuel flow rate to the engine and the measured volumetric concentration. Next, an engine air-to-fuel-flow ratio is determined when the engine is running at the selected fixed operating conditions to obtain a second relationship between the engine fuel flow rate and the measured air-to-fuel-flow ratio. Then, a gaseous test substance, having a known concentration of the gaseous test species, is added to the engine exhaust at a constant known flow rate and the volumetric concentration of the test species in the engine exhaust is measured again to obtain a third relationship between the fuel flow rate to the engine and the new measured volumetric concentration. Finally, the first, second and third fuel flow relationships are combined to obtain the rate of fuel flow to the engine when the engine is running at the selected fixed operating conditions Conventional injectant supply and metering equipment is used to add the test substance to the engine exhaust at the known constant flow rate. The volumetric concentration measurements and air-to-fuel-flow ratio measurement are made by standard exhaust gas sampling and analysis equipment. The rate of fuel flow to the engine may be easily, quickly, accurately, and reliably calculated by an electronic computer processing system supplied with data from the gas sampling and analysis equipment and the injectant supply and metering equipment.

BRIEF DESCRIPTION OF THE DRAWINGS

Other objects and advantages of the present invention will be apparent from the following detailed description in conjunction with the accompanying drawings in which.

DESCRIPTION OF THE PREFERRED EMBODIMENTS

Figure 1:
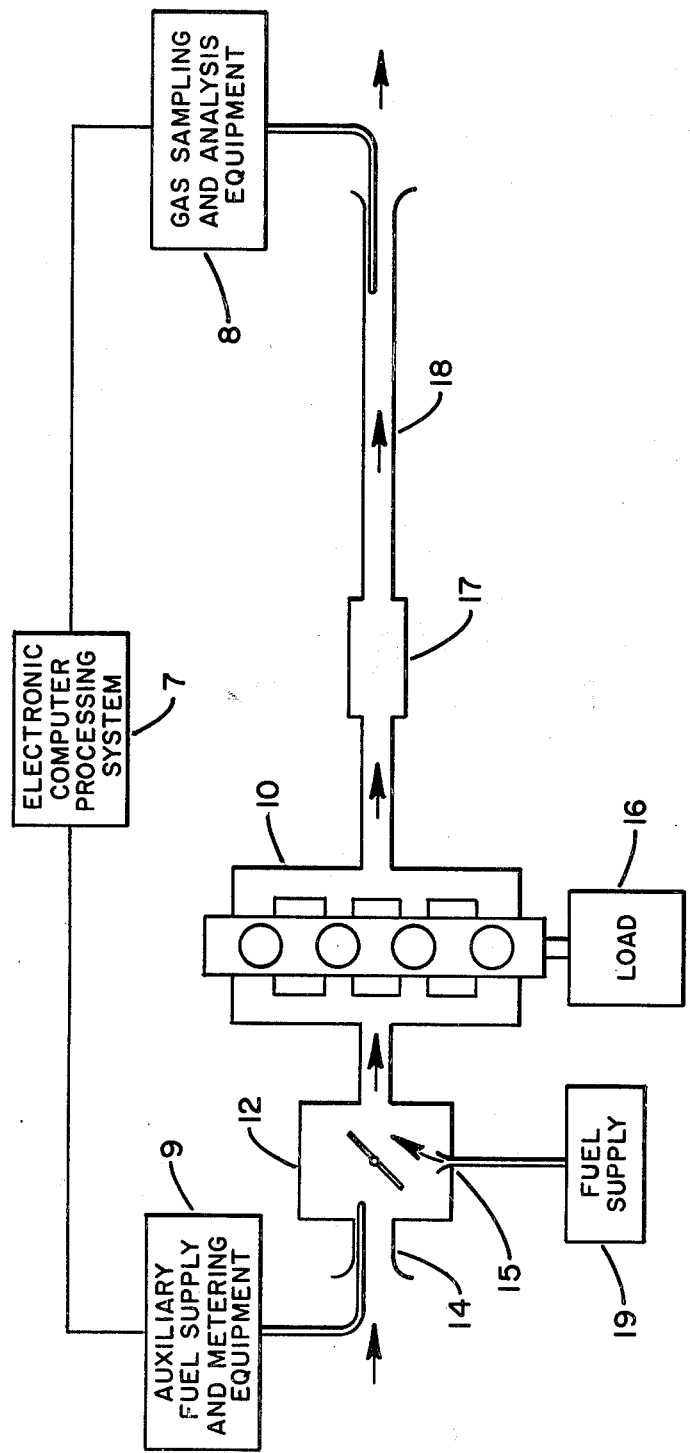
FIG. 1 shows apparatus for determining rate of fuel flow to an internal combustion engine according to the principles of the present invention by means of supplementary fuel injection at the air intake to the engine.

Referring to FIG. 1, apparatus is shown for determining rate of fuel flow to an internal combustion engine 10 according to the present invention by means of supplementary fuel injection at the air intake 14 to the engine 10. As shown in FIG. 1, a carburetor 12 having an air intake 14 and a fuel intake 15, supplies an air-fuel mixture to the engine 10. The engine 10 drives a load 16 such as the drive train for a vehicle. Also, as shown in FIG. 1, exhaust products from the engine 10 pass through a muffler and catalytic reactor 17 and are expelled to the surrounding atmosphere from the tailpipe 18. However, it should be noted that the present invention does not depend on the presence of a muffler and catalytic reactor 17 and this equipment may not be present. Flow through the engine 10 is shown by the solid arrows of FIG. 1.

Fuel is supplied to the carburetor 12 from a fuel supply 19 and air is drawn into the carburetor 12 from the surrounding atmosphere through the air intake 14. When determining the rate of fuel flow to the engine 10, auxiliary fuel supply and metering equipment 9 is used to selectively increase fuel flow to the carburetor 12 without substantially altering the rate of air flow to the carburetor 12. The auxiliary fuel supply and metering equipment 9 may be a commercially available frequency modulated fuel injection valve (such as available from Robert Bosch GmbH of Stuttgart, West Germany) which is placed in the air intake 14 and connected to a fuel delivery system.

Gas sampling and analysis equipment 8 monitors concentrations of selected gaseous exhaust species from which the ratio of air flow rate to fuel flow rate to the engine is determined. A computerized gas analyze available from Hamilton Test Systems, Inc. in Tucson, Arizona, or a model 590 infrared exhaust analyzer or model 591 HC/CO/CO$_2$ exhaust gas analyzer available from Bechman Instruments, Inc. in Fullerton, California, may be used as the gas sampling and analysis equipment 8 for measuring the gas concentrations.

One method of determining the air-to-fuel-flow ratio from the measured gas concentrations is by using the "Spindt procedure". This procedure is a well-known gas concentration analysis technique and is described in a paper entitled "Air-Fuel Ratios from Exhaust Gas Analysis" by R. S. Spindt, dated May, 1965 and available from the Society of Automotive Engineers, Inc.-(SAE), 485 Lexington Ave., New York, NY (SAE paper 650507). This paper is incorporated herein by reference. An electronic computer processing system 7 programmed to perform the calculations and electronic processing described herein, uses data from the gas sampling and analysis equipment 8 in combination with information on the setting of the auxiliary fuel supply and metering equipment 9 to calculate rate of fuel flow to the engine 10 when the engine is running at selected fixed operating conditions. The processing system 7 may be anything from a pocket calculator to a sophisticated computer system operating in response to electrical signals indicative of the monitored variables.

The rate of fuel flow to the engine 10 is determined by first measuring the ratio of air flow rate to fuel flow rate to the engine 10 when the engine is running at selected fixed operating conditions. This first air-to-fuel-flow ratio, $R_1$, is given by the equation: $R_1 = \dot{A}/\dot{F}$ where $\dot{A}$ is the weight flow rate of air to the engine, and $\dot{F}$ is the weight flow rate of fuel to the engine 10 which it is desired to determine. After this first relationship is obtained, additional fuel is added at a known rate to the air intake 14 to the carburetor 12 by the auxiliary fuel supply and metering equipment 9. Then the ratio of air flow rate to fuel flow rate is measured again, after the fuel flow is increased, to obtain a second air-to-fuel-flow ratio, $R_2$, given by: $R_2 = \dot{A}/[\dot{F} + (\Delta \dot{F})]$ where $(\Delta \dot{F})$ is the increment by which the fuel flow rate is increased.

The quantity of fuel which is added to incrementally alter the air-fuel ratio to the engine 10 is arbitrary. However, tests have shown that the precision with which engine fuel flow rates can be determined improves as the amount of additional fuel injected is increased. The practical upper limit on the amount of fuel that can be added is reached when particulate exhaust products are generated in appreciable quantities.

The first and second air-to-fuel-flow ratios provide two equations having two unknowns, namely, $\dot{A}$ and $\dot{F}$. These two equations may be combined and solved for the variable $\dot{F}$ thereby giving the following equation: $\dot{F} = R_2(\Delta \dot{F})/[R_1 - R_2]$ wherein all parameters on the right hand side of the equation are known measured quantities. Therefore, the rate of fuel flow to the engine 10 is calculated by substituting the measured values of the parameters into the equation.

This rate of fuel flow may be easily, quickly, reliably, and accurately calculated by an electronic computer processing system 7 connected as shown in FIG. 1. Electrical signals corresponding to the measurements made by the gas sampling and analysis equipment 8 and to the known additional fuel flow rate provide input data to the computer processing system 7 which is preprogrammed to calculate $\dot{F}$ from this data according to the equation for $\dot{F}$ given above.

It should be noted that one requirement necessary for accomplishing the foregoing method of determining rate of fuel flow to the engine 10 is that the rate of air flow to the engine be substantially fixed during the exhaust gas composition measurements made before and during injection of the additional fuel. This condition is easily satisfied, so long as throttle positiion is held fixed, because, typically, in combustion-driven engines the flow of air normally remains choked at the caburetor 12 regardless of the rate of fuel flow over wide ranges of part throttle engine operation.

Figure 2:
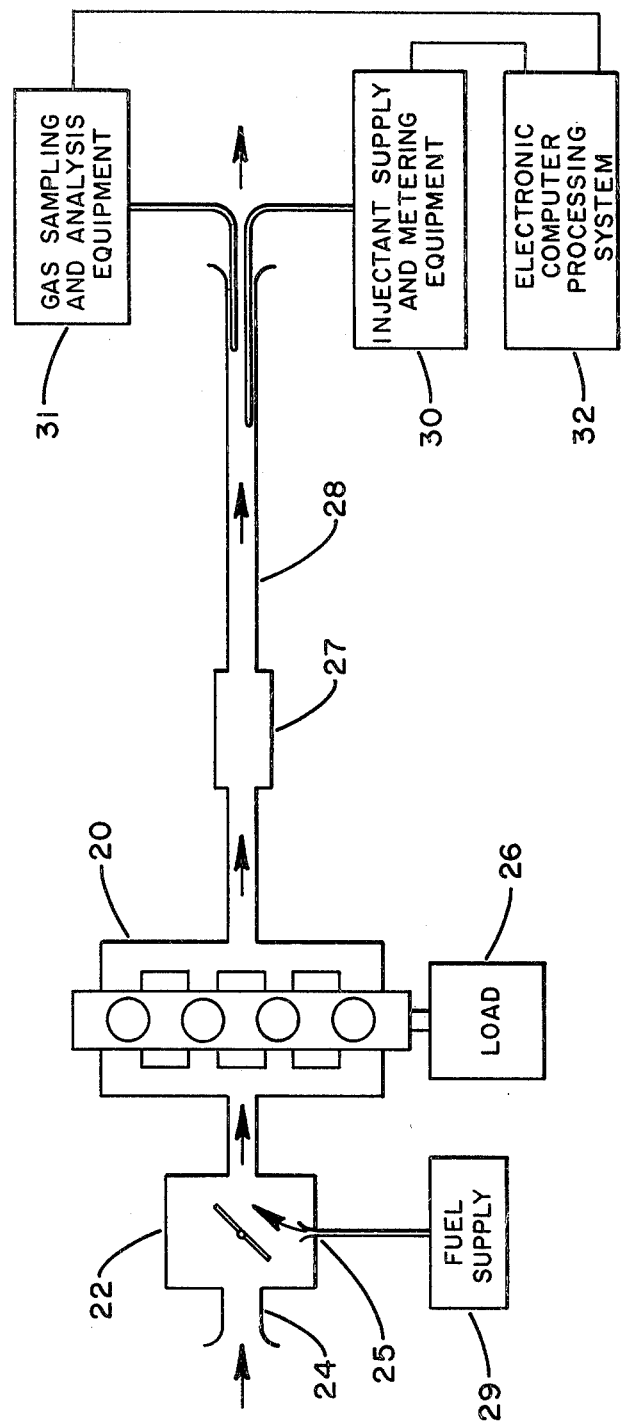
FIG. 2 shows apparatus for determining rate of fuel flow to a combustion engine according to the present invention by means of supplementary gaseous test species injection into the exhaust from the engine.

Referring to FIG. 2, apparatus is shown for determining rate of fuel flow to an internal combustion engine 20 according to the present invention by means of supplementary gaseous test species injection into the exhaust from the engine 20. As shown in FIG. 2, a carburetor 22 having an air intake 24 and a fuel intake 25, supplies an air-fuel mixture to the engine 20. The engine 20 drives a load 26 such as the drive train of a vehicle. Exhaust products from the engine 20 pass through a muffler and catalytic reactor 27, if present, and are expelled to the surrounding atmosphere from the tailpipe 28. Flow through the engine 20 is shown by the solid arrows of FIG. 2.

Figure 3:
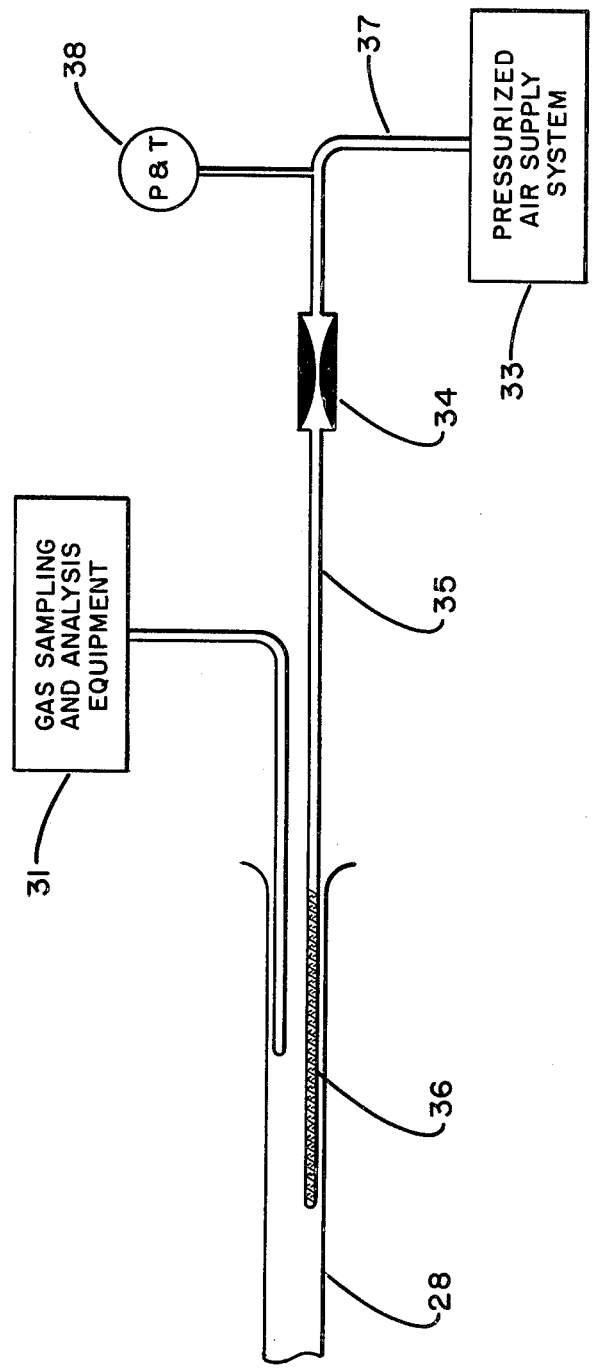
FIG. 3 shows an example of the injectant supply and metering equipment 30 of FIG. 2.

Fuel is supplied to the carburetor 22 from a fuel supply 29 and air is drawn into the carburetor 22 from the surrounding atmosphere through the air intake 24. When determining the rate of fuel flow to the engine 20, injectant supply and metering equipment 30 is used to selectively increase the quantity of a gaseous test species in the exhaust from the engine 20. As shown in FIG. 3, if the selected test species is oxygen, the injectant supply and metering equipment 30 may comprise a pressurized air supply system 33, such as a standard garage air compressor system, having an outlet hose or tube 37 connected through an airflow metering orifice 34, such as a venturi, to a flexible hose 35. The hose 35 may have a flexible steel-braided end portion 36 for easy insertion into the tailpipe 28. A combination pressure and temperature gauge 38 may be used to monitor the air pressure from the air supply 33.

Gas sampling and analysis equipment 31, which may be the same as the equipment 8 described relative to FIG. 1, monitors concentration of the gaseous test species in the exhaust and the concentration of other gaseous species from which the ratio of air flow rate to fuel flow rate to the engine 20 is determined, possibly according to the Spindt procedure. An electronic computer processing system 32, which may be in the same as the system 7 described relative to FIG. 1, uses data from the gas sampling and analysis equipment 31 in combination with information of the known additional flow of the injected test species to calculate rate of fuel flow to the engine 20 when the engine is running at selected fixed operating conditions.

Rate of fuel flow to the engine 20 is determined by measuring the ratio of air flow rate to fuel flow rate to the engine 20 when the engine is running at the selected fixed operating conditions. This first air-to-fuel-flow ratio, $R_1$, is given by the equation:

$$R_1 = \dot{A}/\dot{F} = (\dot{W}_T - \dot{F})/\dot{F} = (\dot{n}_T \zeta_T - \dot{F})/\dot{F}$$

where $\dot{A}$ is the weight flow rate of air to the engine 20, $\dot{F}$ is the engine fuel flow rate which it is desired to determine, $\dot{W}_T$ is the total engine through-flow (that is, the sum of the engine air and fuel weight flow rates, whereby $\dot{W}_T = \dot{n}_T \zeta_T$), $\dot{n}_T$ is the molar flow rate of the total engine through-flow, and $\zeta_T$ is the average molecular weight of the exhaust gas mixture flowing through the engine 20.

In addition to the ratio, $R_1$, a volumetric concentration of a particular gaseous test species in the exhaust from the engine 20 is measured when the engine is running at the selected fixed operating conditions. Thus, a second relationship is obtained given by the equation:

$$R_2 = \dot{n}_x / \dot{n}_T$$

where $\dot{n}_x$ is the molar flow rate of the test species x in the exhaust and $\dot{n}_T$ is the molar flow rate of the total engine through-flow.

Then a gaseous test substance is injected into the engine exhaust by the injectant supply and metering equipment 30 in the tailpipe 28 upstream of the gas sampling and analysis equipment 31. The test substance has a known concentration of the selected gaseous test species and is injected into the engine exhaust at a location where exhaust gas-injectant reactions are precluded but sufficiently far upstream of the exhaust gas sampling equipment 31 to ensure that the injectant is thoroughly mixed with the other exhaust gases prior to removal of a sample for analysis by the gas sampling and analysis equipment 31. After the test substance is injected into the exhaust, the volumetric concentration of the gaseous test species in the exhaust is measured by the gas sampling and analysis equipment 31 to provide a third relationship given by the formula:

$$R_3 = (\dot{n}_x + \dot{n}_{xy})/(\dot{n}_T + \dot{n}_y) = (\dot{n}_x + ([x]_y \dot{W}_y/\zeta_y))/(\dot{n}_T + \dot{W}_y/\zeta_y)$$

where $\dot{n}_{xy}$ is the molar flow rate of gaseous test species x in test substance y, $\dot{n}_y$ is the molar flow rate of the injected test substance y, $[x]_y$ is the volumetric concentration of the gaseous test species x in the injected test substance y (that is, $[x]_y = \dot{n}_{xy}/\dot{n}_y$), $\zeta_y$ is the average molecular weight of the injected test substance y, and $\dot{W}_y$ is the weight through-flow of test substance y (that is, $\dot{W}_y = \dot{n}_y \zeta_y$).

The first, second and third relationships given above comprise three equations with three unknowns, namely, $\dot{F}$, $\dot{n}_x$, and $\dot{n}_T$. These three equations may be combined and solved for the variable $\dot{F}$ thereby giving the following equation:

$$\dot{F} = (\dot{W}_y (\zeta_T/\zeta_y)([x]_y - R_3))/((1 + R_1)(R_3 - R_2))$$

wherein all parameters on the right hand side of the equation are known or measured quantities, except for the quantity $\zeta_T/\zeta_y$ which is readily estimated. Therefore, the rate of fuel flow to the engine 20 is calculated by substituting the known, measured, and estimated values of the parameters into the equation.

This rate of fuel flow may be easily, quickly, reliably, and accurately calculated by an electronic computer processing system 32 connected as shown in FIG. 2. Electrical signals corresponding to the measurements made by the gas sampling and analysis equipment 31 and to the known additional flow of the injected test species provide input data to the computer processing system 32 which is pre-programmed to calculate $\dot{F}$ from the input data according to the equation for $\dot{F}$ given above.

It should be noted that if the test substance y which is injected into the engine exhaust is composed only of the gaseous test species x, that is, if $\dot{W}_y = \dot{W}_x$ then $[x]_y = 1$ and the equation for $\dot{F}$ given above reduces to the following:

$$\dot{F} = (\dot{W}_x (\zeta_T/\zeta_x)(1 - R_3))/((1 + R_1)(R_3 - R_2))$$

where $\zeta_x$ is the molecular weight of the test substance x.

Also, it should be noted that the average molecular weight ratio, $\zeta_T/\zeta_y$, can be precisely determined from analysis of measured exhaust species concentrations but it is more convenient and sufficiently accurate to use a nominal value of 28 for $\zeta_T$ in typical combustion-driven engine situations. The actual value of $\zeta_T$ only varies within a range of approximately plus or minus 2% from this nominal value for a wide range of engines operating with either lean, stoichemetric or rich mixtures at varying degrees of combustion efficiency as long as the air-fuel ratio remains at a value equal to or greater than approximately 12. This air-fuel ratio criteria is met by most combustion-driven engines.

Further, it should be noted that the quantity of the gaseous test species which is injected into the engine exhaust is arbitrary but that precision of the fuel flow rate determination is improved as the quantity of injectant is increased. Therefore, it is desirable to select a gaseous test species that occurs in relatively small concentrations in the engine exhaust so that it is not necessary to use large injectant flow rates. Oxygen appears to be an especially attractive species in this regard because the use of oxygen results in measurement precision comparable to that of direct fuel flow metering devices. Another advantage of using oxygen as the test species is that air is a convenient source for the oxygen and air may be readily used as the test substance y, if desired.

Still further, it should be noted that the gaseous test species may be added to the engine exhaust by means of a tube inserted into the tailpipe 28 of the vehicle as shown in FIG. 3. The required penetration depth of the tube into the exhaust 28 can be minimized by adding mixing devices to the tube and/or by arranging injectant ports in the tube such that a near uniform concentration profile is created at the point of injection.

Still further, a few of the advantages of rate of fuel flow determinations according to the present invention should be noted. Exhaust gas analysis equipment 8 and 31, fuel supply and metering equipment 9, injectant supply and metering equipment 30, and electronic computer processing systems 7 and 32 are available at or can be easily obtained by garages and motor vehicles inspection facilities. Also, this equipment is relatively simple, easy to operate, and inexpensive. Thus, the present invention may be easily implemented at garages and MVI locations. Also, according to the present invention, mechanical intrusion into the engine/vehicle hardware is not required and the mode of adding fuel or injecting a gaseous test species is not critical. Therefore, highly skilled operators are not required to carry out the present invention. However, rate of fuel flow to an engine is still determined with adequate accuracy for most practical applications.

Finally, while the present invention has been described in conjunction with particular embodiments it is to be understood that various modifications and other embodiments of the present invention may be made without departing from the scope of the invention as described herein and as claimed in the appended claims.

What is claimed is:

1. A method of determining rate of fuel flow to a combustion-driven engine running at selected fixed operating conditions which comprises the steps of:
    measuring volumetric concentrations of selected gaseous species in the exhaust from the engine;
    determining from the concentration measurements the ratio of air flow rate to fuel flow rate to the engine when the engine is running at the selected fixed operating conditions to obtain a first air-to-fuel-flow-ratio;
    adding additional fuel at a predetermined constant flow rate to the air-fuel flow to the engine;
    measuring the volumetric concentrations of the selected gaseous species again, after the additional fuel is added to the air-fuel flow to the engine;
    determining from the second concentration measurements the ratio of air flow rate to fuel flow rate to the engine to obtain a second air-to-fuel flow ratio; and
    comparing the product of the second air-to-fuel-flow ratio and the known additional fuel flow rate to the difference between the first air-to-fuel-flow ratio and second air-to-fuel-flow ratio to obtain the rate of fuel flow to the engine when the engine is running at the selected fixed operating conditions.

2. A method of determining rate of fuel flow to a combustion-driven engine running at selected fixed operating conditions as recited in claim 1 wherein the step of adding additional fuel at a predetermined constant flow rate to the air-fuel flow to the engine comprises adding fuel at a rate no greater than that which results in generation of particulate exhaust products.

3. A method determining rate of fuel flow to a combustion-driven engine running at selected fixed operating conditions which comprises the steps of:
    measuring volumetric concentration of a particular gaseous test species in the exhaust from the engine when the engine is operating at the selected fixed operating conditions to obtain a first relationship between fuel flow rate to the engine and the measured concentration of the gaseous test species in the exhaust;
    determining the air-to-fuel-flow ratio to the engine when the engine is running at the selected fixed operating conditions to obtain a second relationship between the engine fuel flow rate and the measured air-to-fuel-flow ratio;
    adding to the engine exhaust at a constant known flow rate a gaseous test substance having a known concentration of the gaseous test species;
    measuring volumetric concentration of the test species in the exhaust from the engine while the test substance is added to obtain a third relationship between the fuel flow rate to the engine and the measured concentration of the test species in the exhaust when the test substance is added to the exhaust; and
    combining the first, second, and third fuel flow rate relationships to obtain the rate of fuel flow to the engine when the engine is running at the selected fixed operating conditions.

4. A method of determining rate of fuel flow to a combustion-driven engine running at selected fixed operating conditions as recited in claim 3 wherein the gaseous test species is a substance having a relatively low volumetric concentration in the exhaust from the engine compared to the concentrations of other gaseous species in the exhaust before the test substance is added to the exhaust.

5. A method of determining rate of fuel flow to a combustion-driven engine running at selected fixed operating conditions as recited in claim 3 wherein the gaseous test substance is air having a known concentration of oxygen as the gaseous test species.

6. A method of determining rate of fuel flow to a combustion-driven engine running at selected fixed operating conditions as recited in claim 3, 4, or 5, wherein the volumetric concentration of the gaseous test species added to the engine exhaust is relatively large compared to the volumetric concentration of the test species in the engine exhaust before the test substance is added to the exhaust.

* * * * *